United States Patent
Mertens et al.

(10) Patent No.: US 11,505,770 B2
(45) Date of Patent: Nov. 22, 2022

(54) PRODUCTION OF HULUPONES AND HULUPONES PRODUCTS

(71) Applicant: IFAST NV; Innovative Flavor & Aroma Science & Technology, Roosdaal (BE)

(72) Inventors: Pascal Mertens, Roosdaal (BE); Laurens Claes, Mechelen (BE)

(73) Assignee: IFAST NV, INNOVATIVE FLAVOR & AROMA SCIENCE & TECHNOLOGY, Roosdaal (BE)

( * ) Notice: Subject to any disclaimer, the term of this patent is extended or adjusted under 35 U.S.C. 154(b) by 468 days.

(21) Appl. No.: 16/603,385

(22) PCT Filed: Apr. 6, 2018

(86) PCT No.: PCT/EP2018/058872
§ 371 (c)(1),
(2) Date: Oct. 7, 2019

(87) PCT Pub. No.: WO2018/185291
PCT Pub. Date: Oct. 11, 2018

(65) Prior Publication Data
US 2020/0325425 A1    Oct. 15, 2020

(30) Foreign Application Priority Data
Apr. 6, 2017 (EP) ..................................... 17165284

(51) Int. Cl.
| | |
|---|---|
| *C12C 3/12* | (2006.01) |
| *B01D 11/02* | (2006.01) |
| *B01D 15/36* | (2006.01) |
| *C12C 5/02* | (2006.01) |
| *C12C 7/20* | (2006.01) |

(52) U.S. Cl.
CPC ............ *C12C 3/12* (2013.01); *B01D 11/0288* (2013.01); *B01D 15/361* (2013.01); *C12C 5/026* (2013.01); *C12C 7/205* (2013.01)

(58) Field of Classification Search
CPC ......... C12C 7/205; C12C 11/11; C12C 5/026; C12C 3/12; B01D 11/0288; B01D 15/361
See application file for complete search history.

(56) References Cited

U.S. PATENT DOCUMENTS

| | | |
|---|---|---|
| 4,340,763 A | 7/1982 | Wuesthoff |
| 4,717,580 A | 1/1988 | Forrest et al. |

FOREIGN PATENT DOCUMENTS

| | | |
|---|---|---|
| CA | 1178615 | 11/1984 |
| EP | 0032639 A2 | 7/1981 |
| GB | 1424786 | 2/1976 |
| WO | 2016038212 A1 | 3/2016 |

OTHER PUBLICATIONS

International Search Report issued in PCT Application No. PCT/EP2018/058872.
Written Opinion issued in PCT Application No. PCT/EP2018/058872.

*Primary Examiner* — Vera Stulii
(74) *Attorney, Agent, or Firm* — Gianna Julian-Arnold; Saul Ewing Arnstein & Lehr LLP

(57) ABSTRACT

The invention relates to a method for the production of hulupones, in particular for the production of hulupones products, suitable for beer bittering, essentially free of compounds, typically formed as side-products during the lupulones oxidation, that can cause negative impact in terms of aroma, taste or haze upon brewing application. The invention also relates to hulupones products, suitable for beer bittering and obtainable by the method of the invention, essentially free of compounds with negative aroma, taste or haze impact upon addition of the hulupones products during the brewing process. The invention also relates to beer bittering with hulupones products, obtainable by the method of the invention, not causing an undesirable or unacceptable aroma, taste or haze impact in the bittered beer.

31 Claims, No Drawings

PRODUCTION OF HULUPONES AND HULUPONES PRODUCTS

The invention relates to a method for the production of hulupones, in particular for the production of hulupones products, suitable for beer bittering, essentially free of compounds, typically formed as side-products during the lupulones oxidation, that can cause negative impact in terms of aroma, taste or haze upon brewing application. The invention also relates to hulupones products, suitable for beer bittering and obtainable by the method of the invention, essentially free of compounds with negative aroma, taste or haze impact upon addition of the hulupones products during the brewing process. The invention also relates to beer bittering with hulupones products, obtainable by the method of the invention, not causing an undesirable or unacceptable aroma, taste or haze impact in the bittered beer.

BACKGROUND OF THE INVENTION

Hulupones (principal analogues are co-hulupone (molecular weight 318 g/mol), n-hulupone and ad-hulupone (molecular weight 332 g/mol); usually, a hulupone is thus a co-hulupone, a n-hulupone or an ad-hulupone) are naturally occurring hop acids that can impart a bitter taste to beer. Hulupones are compounds oxidatively formed, however with a low selectivity and to a limited extent, from hop beta-acids or lupulones (principal analogues are co-lupulone (molecular weight 400 g/mol), n-lupulone and ad-lupulone (molecular weight 414 g/mol); usually, a lupulone is thus a co-lupulone, a n-lupulone or an ad-lupulone) during hop storage or wort boiling. These hulupones can also be produced intentionally, typically applying oxidation processes using lupulones as the substrate and optionally also applying separation processes. In the prior art, multiple methods have been described to produce hulupones and hulupones products. From the literature, it is known that in the oxidation of lupulones in the free acid form apart from the hulupones a large fraction of undesired side-products is formed, whereas a higher selectivity to the desired hulupones can be achieved by for example aqueous oxidation of lupulones in the dissociated form (as for example potassium salts).

GB 1,064,068 reports on the oxidation of lupulones in a water-immiscible organic solvent (i.e. trichloroethylene) at ambient temperature with subsequent solvent removal by distillation to concentrate the obtained hulupones containing mixture, which can be followed by steam distillation to fractionate the hop essential oil compounds.

GB 2,072,657 reports on the oxidation of lupulones, after mixing a lupulones containing extract with an adsorbent (e.g. sodium bentonite) to obtain a powdery extract, followed by $CO_2$ extraction to yield hulupones.

U.S. Pat. Nos. 3,977,953 and 4,013,721 respectively describe a photo-sensitized (using specific sensitizing dyes and visible light) and a catalyzed (applying diverse heterogeneous catalysts) oxidation of lupulones, and a separation involving acidification of the process mixture to a low pH value (e.g. pH 1) followed by extraction of the hulupones (and other lupulones oxidation products formed as side-products) with a water-immiscible organic solvent (i.e. hexane), optionally followed by solvent evaporation.

BE 805,280 describes the catalyzed oxidation of beta-acids in aqueous alkaline solutions, followed by a purification step, either by precipitation of the hulupones (and other lupulones oxidation products formed as side-products) from the aqueous process mixture by addition of aqueous acid or alkaline earth metal salt solutions, or by evaporation of the short-chain fatty acid side-products (for example by means of distillation under reduced pressure) from the product phase containing hulupones.

U.S. Pat. No. 4,717,580 describes the production of hulupones by oxidation of lupulones in aqueous alkaline media, followed by pH reduction to about 7.5 to precipitate unreacted lupulones and subsequent further pH reduction to about 4.5 combined with a boiling stage to convert the lupuloxinic acid side-product (as reported formed with the same product selectivity as the desired hulupones under the oxidation process conditions of U.S. Pat. No. 4,717,580) to lupulenol which precipitates out to yield hulupones (around 30-35% yield of hulupones).

U.S. Pat. No. 4,340,763 reports on the precipitation of hulupones salts (i.e. alkali metal hulupates) during the catalyzed (typically applying a heterogeneous platinum on carbon catalyst) aqueous alkaline oxidation of lupulones, and the direct separation of a product phase containing hulupones salts by filtration or decantation, followed by washing with water, dissolving in an organic solvent (i.e. methanol) enabling catalyst removal by filtration and evaporating the organic solvent to yield the hulupones product, with purities of the hulupones product phase in the range of 50 to 70%, and thus side-product fractions in the range of 30 to 50%.

From the prior art methods, we learn that the production of hulupones starting from lupulones usually comprises at least two processing steps, one the oxidation of lupulones (optimally with high selectivity and productivity to form the hulupones) and another the purification of hulupones (optimally with high selectivity and efficiency to separate the hulupones).

For the preparation of a hulupones product of high purity and quality (with ideally no (potential) negative impact on aroma, taste or haze) for the organoleptic evaluation of hulupones as beer bittering agents, initially the methods described in U.S. Pat. Nos. 4,717,580 and 4,340,763 were tentatively assessed and the obtained hulupones products were tested and evaluated as beer bittering preparations in terms of (bitter) taste characteristics in the first instance, and also in terms of aroma quality and haze presence (potential negative impact).

It was found that major disadvantages of the U.S. Pat. No. 4,717,580 method for the preparation of aqueous hulupones solutions were the large fraction of short-chain fatty acid compounds (predominantly 2-methyl-propanoic acid (molecular weight 88 g/mol), 3-methyl-butanoic acid and 2-methyl-butanoic acid (molecular weight 102 g/mol)) relative to the content of hulupones in the obtained aqueous hulupones product phase, which can be related to the large portion of lupuloxinic acid (molecular weight 362 g/mol; being a derivative of lupulones initially hydroxylated at the C2 position) formed during the lupulones oxidation process also causing formation of short-chain fatty acids, and the ineffectiveness of the further processing steps to separate the undesired short-chain fatty acid compounds from the hulupones, which caused an offensive rancid aroma upon the post-fermentation addition to the non-bittered beer of the aqueous hulupones solution produced with the method of U.S. Pat. No. 4,717,580. The bitter taste characteristics as such obtained by the addition of the obtained hulupones product were agreeable and pleasant. It was also found after performing the lupulones oxidation process as described in U.S. Pat. No. 4,717,580, that a large fraction of the formed lupuloxinic acid had already been converted to lupulenol (molecular weight 318 g/mol; being a decarboxylated derivative of lupuloxinic acid) and that also dehydrolupulenol (molecular weight 316 g/mol; being an oxidized derivative of lupulenol) was formed during the lupulones oxidation process, and that a substantial fraction of lupulenol and dehydrolupulenol remained in the final hulupones containing product phase even after the post-oxidation processing steps.

The principal drawback of the method described in U.S. Pat. No. 4,340,763 is the large fraction of side-products (not identified in U.S. Pat. No. 4,340,763) in the precipitated hulupones containing product phase (30-50% as reported in U.S. Pat. No. 4,340,763). Now various compounds other than hulupones, i.a. 5-(3-methyl-2-butenyl)-isohumulones (typically with molecular weights 416 and 430 g/mol; being isomerized derivatives of 4-hydroxy-lupulones, at their turn being hydroxylated lupulones, more specifically derivatives of lupulones hydroxylated at the C4 position), lupulones derivatives with a retained six-membered ring from the original lupulones with a molecular weight higher than the lupulones, such as 4-hydroxy-lupulones (typically with molecular weights 416 and 430 g/mol) or lupulones transformed by epoxidation in one or more of the 3-methyl-2-butenyl side-chains, bi- and tricyclic lupulones derivatives with a retained six-membered ring from the original lupulones (the bicyclic derivatives typically formed after initial epoxidation of an unsaturated carbon-carbon bond in a 3-methyl-2-butenyl side-chain of the lupulones, typically also involving cyclization thereby forming five-membered furanoid or six-membered pyranoid rings, thus being derivatives of epoxidized lupulones; the tricyclic derivatives typically originating from the lupulones containing starting material), and also remaining lupulones (not being transformed during the lupulones oxidation process) were detected and identified in the precipitated hulupones containing product phase. The effect of the post-fermentation addition of the hulupones product produced with the method of U.S. Pat. No. 4,340,763 (without the evaporation of the alcoholic solvent, in this case ethanol was used instead of methanol) to the non-bittered beer resulted in a beer bittering that was in three aspects problematic. Firstly, the aroma of the non-hopped beer was altered and the impact was characterized as rancid and fruity; however, the rancid aroma effect was less offensive than for the hulupones preparations based on U.S. Pat. No. 4,717,580. Secondly, the addition led to haze in the bittered beer because of the presence of bi- and tricyclic lupulones derivatives with a retained six-membered ring from the original lupulones, of other lupulones derivatives with a retained six-membered ring from the original lupulones with a molecular weight higher than the lupulones, and of remaining lupulones. These haze-inducing compounds also caused to some extent a disagreeable lingering bitter taste, in particular in case of high post-fermentation addition levels, to the beer. Thirdly, the presence of 5-(3-methyl-2-butenyl)-isohumulones led to an undesirable and unpleasant light-struck off-flavour (skunky thiol aroma) occurring upon exposure of the bittered beer to visible light. This was verified by respectively fractionation of these haze-inducing compounds and the 5-(3-methyl-2-butenyl)-isohumulones followed by separate addition (thus without addition of hulupones or other compounds groups) to a non-hopped beer.

Also for hulupones products based on other prior art methods as described above, similar or analogous negative impacts in terms of aroma, taste or haze, upon post-fermentation addition to the non-bittered beer, were found in a series of lager beer bittering trials.

It is an object of the present invention to address this problem of unacceptable or unintended aroma and taste and/or undesirable haze impact caused by hulupones products obtained by methods described in the prior art upon use of these hulupones products as beer bittering preparations. One or more alternative or additional objects of the invention follow from the remainder of this disclosure.

SUMMARY OF THE INVENTION

From additions of various hulupones products (produced by oxidative transformation of lupulones), varying in fraction (relative to the hulupones content) of short-chain fatty acid compounds (such as 2-methyl-propanoic acid, 3-methyl-butanoic acid and 2-methyl-butanoic acid), of hop oil compounds (for example hop monoterpenes such as myrcene and sesquiterpenes such as humulene) and of lupulones oxidation side-products such as lupuloxinic acid, (dehydro)lupulenol, 5-(3-methyl-2-butenyl)-isohumulones, bi- and tricyclic lupulones derivatives with a retained six-membered ring from the original lupulones, lupulones derivatives with a retained six-membered ring from the original lupulones with a molecular weight higher than the lupulones, and also of remaining lupulones, during the brewing process for bittering the beer prior to or after the fermentation stage, for organoleptic evaluation tests performed on lager beers (and also on ale beers), we learnt that the presence of such short-chain fatty acid compounds in a hulupones product can cause rancid aroma (and also fruity aroma, upon esterification with ethanol), that the presence of hop oil compounds in a hulupones product can lead to a beer with an altered aroma profile (for example leading to herbal or floral aroma characteristics), and that the presence of lupulones oxidation side-products can cause negative impact in terms of risk of haze formation and sensitivity to light-struck off-flavour (skunky thiol aroma) formation upon exposure of the bittered beer to (visible) light.

Based upon these insights of the critical nature of the presence and content of specific lupulones oxidation side-products, short-chain fatty acid compounds and hop oil compounds in hulupones products for use as beer bittering preparations, methods and products have been developed that provide a solution to the problem of unacceptable or unintended aroma and taste and/or undesirable haze impact.

It now has been found that optimization of the process conditions of the aqueous lupulones oxidation enables to further increase the selectivity and productivity towards hulupones compared to the hulupones yields obtainable with the methods of the prior art, or thus to reduce the formation of undesired side-products, in particular to reduce the formation of lupuloxinic acid, bi- and tricyclic lupulones derivatives with a retained six-membered ring from the original lupulones, and also hydroxy-hulupones and hulupinic acid; with a strong dependency of the hulupones yields on the presence of basic compounds and the oxygen availability in the process medium.

It now has been invented that by precipitating the hulupones as alkali metal or alkaline earth metal hulupates from the aqueous alkaline medium in which the lupulones oxidation is carried out, followed by separating this precipitate phase comprising hulupates from the aqueous alkaline medium, optionally followed by washing this precipitate phase with (deionized) water, further followed by converting the hulupates from the precipitate phase into hulupones in the free acid form, optimally by acidification, finally followed by selective extraction of the hulupones with an aqueous medium from the precipitate phase comprising hulupones in the free acid form, enables to obtain an aqueous product phase comprising hulupones with proportionally a low to very low fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones and also remaining unreacted lupulones.

It now has been found that by selective aqueous extraction of hulupones from a precipitate phase comprising hulupones in the free acid form also comprising other compounds such as 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, it is achievable to obtain a hulupones product with proportionally a low to very low fraction of other compounds, or even to obtain a hulupones product essentially free of those compounds with a potential negative impact in terms of aroma, taste or haze upon addition during the brewing process, even upon post-fermentation addition.

It now has been found that by performing the oxidative transformation of lupulones into hulupones in an alcoholic solvent medium (e.g. only ethanol or ethanol mixed with water), or another polar organic solvent medium such as a solvent medium comprising acetic acid or ethyl acetate, in the presence of alkaline earth metal cations, provided as alkaline earth metal complexes or salts (for example magnesium chloride), a high selectivity and productivity to hulupones can be achieved with thus a low fraction of side-products such as lupuloxinic acid (of which the formation also causes short-chain fatty acid formation), (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones. A further increase in selectivity to hulupones can be achieved in case alkali metal base or salt is also introduced to the process mixture in an optimal ratio to the initially present lupulones. It thus now has been found that under these lupulones oxidation process conditions, the formation of lupuloxinic acid in the first instance but also of hulupinic acid can be suppressed, and thus also the formation of the undesired short-chain fatty acid compounds can be substantially reduced.

It now also has been found that compounds with a five-membered ring (as the ring of the hulupones) other than the hulupones and the 5-(3-methyl-2-butenyl)-isohumulones can be present to varying extent in the post-oxidation product mixtures (from the prior art), i.a. hulupinic acid (molecular weight 264 g/mol; being a derivative of hulupones, its formation also causing short-chain fatty acid formation), dihydro-hulupones (molecular weights typically 320 and 334 g/mol; being derived from 5-(3-methyl-2-butenyl)-isohumulones), hydroxy-hulupones (molecular weights typically 334 and 348 g/mol; for example 3-hydroxy-hulupones, with hydroxylation on the five-membered hulupone ring, being intermediates in the formation of hulupinic acid), epoxy-hulupones (molecular weights typically 334 and 348 g/mol; involving epoxidation of an unsaturated carbon-carbon bond in a 3-methyl-2-butenyl side-chain of hulupones) and bicyclic hulupones derivatives with a retained five-membered ring as the ring of the hulupones (with for example molecular weights of 352 and 366 g/mol, or 372 and 386 g/mol; typically formed after initial epoxidation of an unsaturated carbon-carbon bond in a 3-methyl-2-butenyl side-chain of hulupones, thus being derivatives of epoxy-hulupones, typically also involving cyclization thereby forming five-membered furanoid or six-membered pyranoid rings). These compounds, predominantly formed by oxidation of hulupones (overoxidation) and present as lupulones oxidation side-products next to the hulupones in the product phase, after reducing the fraction of or removing 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, however do not cause the aforementioned negative impact (aroma, taste or haze) upon their addition at typical addition levels in the lager beer bittering trials, which was found after fractionation and addition of these compounds separately. By optimization of the process conditions of the lupulones oxidation, in the first instance the oxygen supply but also the basic properties of the process medium, it proved possible to limit the formation of overoxidation products and thus also to further increase the hulupones yield.

It now thus has been found that it is achievable to obtain hulupones products, either obtained by aqueous or alcoholic oxidation of lupulones, which apart from the intended bitter taste effect do not cause a negative impact in terms of aroma, taste and haze upon brewing application of those hulupones products as beer bittering preparations.

It now has also been found that in the commercially available beta-acid products, typically aqueous solutions of potassium salts of lupulones (or potassium lupulates), or in beta-acid preparations obtained from for example hop extracts by pH variation based aqueous fractionation, usually hop oil compounds (with potential aroma impact) are present (next to short-chain fatty acids such as 2-methyl-propanoic acid, 3-methyl-butanoic acid and 2-methyl-butanoic acid), which can remain present (as such or transformed, e.g. oxygenated) in the obtained hulupones product and which can thus potentially cause upon addition during the brewing process an unintended or undesired aroma impact to the beer. Apart from these compounds potentially impacting the aroma of the beer, also other compounds potentially causing beer haze were detected in the commercially available beta-acid products, i.a. tricyclic lupulones derivatives with a retained six-membered ring from the original lupulones.

Accordingly, in an aspect the invention relates to a method for the production of hulupones, comprising oxidizing lupulones thereby forming hulupones and lupulones oxidation side-products selected from the group of hydroxylated lupulones, epoxidized lupulones, derivatives of hydroxylated lupulones and derivatives of epoxidized lupulones; the method further comprising separating the hulupones from said side-products.

Accordingly, in an aspect the invention relates to a method for the production of a hulupones product with a mass fraction below 40 weight %, preferably below 20 weight %, more preferably below 10 weight %, most preferably below 5 weight %, relative to the mass of hulupones present, of lupulones oxidation side-products that can cause negative impact in terms of aroma, taste or haze upon use of the hulupones product for beer bittering; the method comprising oxidizing lupulones using gaseous oxygen (or another suitable oxidant) thereby forming hulupones and one or more lupulones oxidation side-products.

Accordingly, in an aspect the invention relates to a method for the production of a hulupones product with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, and lupulones below 40 weight %, preferably below 20 weight %, more preferably below 10 weight %, most preferably below 5 weight %, relative to the mass of hulupones present.

Accordingly, in an aspect the invention relates to a method for the production of a hulupones product comprising oxidizing lupulones in an aqueous alkaline medium thereby forming hulupones and one or more lupulones oxidation side-products selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones; the method further comprising separating the hulupones from said one or more lupulones oxidation side-products. In this aspect, the aqueous medium comprises preferably at least 50 volume % water, more preferably at least 75 volume % water. In this aspect, most preferably water is the sole solvent in the aqueous medium.

Further, the invention relates to a method comprising precipitating hulupones as alkali metal hulupates and optionally also as alkaline earth metal hulupates from the aqueous alkaline medium in which the oxidation of lupulones is carried out.

Further, the invention relates to a method comprising transforming the precipitated alkali metal hulupates and optionally also alkaline earth metal hulupates into hulupones in the free acid form after separating the precipitated phase, comprising hulupones as alkali metal hulupates (and optionally also as alkaline earth metal hulupates) also comprising lupulones oxidation side-product(s) selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, from the aqueous alkaline medium.

In a preferred embodiment, the precipitated alkali metal hulupates and optionally also the precipitated alkaline earth metal hulupates are transformed into hulupones in the free acid form by subjecting the alkali metal hulupates and optionally also the alkaline earth metal hulupates to an acidification. This can be accomplished by acidifying an aqueous medium wherein the alkali metal hulupates and optionally also the alkaline earth metal hulupates are dissolved or dispersed, or by mixing the precipitate phase comprising alkali metal hulupates and optionally also alkaline earth metal hulupates with an aqueous acidic medium. The pH of the aqueous medium after the acidification, in equilibrium with the precipitated phase comprising hulupones in the free acid form, also comprising lupulones oxidation side-product(s) selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, is preferably in the range of 1-6, more preferably in the range of 1-3.

Further, the invention relates to a method comprising carrying out the oxidation of lupulones in an aqueous alkaline medium, preferably comprising at least 50 volume % water, more preferably with at least 75 volume % water, most preferably an all aqueous solvent medium, with preferably an initial lupulones content between 0.5 and 50 weight %, more preferably between 2 and 25 weight %, and with an initial molar ratio of alkali metal cations (e.g. as potassium hydroxide) to lupulones preferably in the range of 1-2.5, more preferably in the range of 1.5-2. Herein the alkali metal cation is preferably provided in the aqueous alkaline medium as an alkali metal base, more preferably alkali metal hydroxide (e.g. potassium hydroxide) or alkali metal carbonate. Such method is in particular advantageous carried out as part of a method for the production of a hulupones product according to the invention wherein the lupulones oxidation takes place in an alkaline aqueous medium.

Advantageously, said method comprises carrying out the oxidation of lupulones in an aqueous alkaline medium with an initial pH value in the range of 8-14, preferably 10-13, more preferably 11-12.

Advantageously, said method comprises carrying out the oxidation of lupulones in an aqueous alkaline medium with a pH value in the range of 8-14, preferably 10-13, more preferably 11-12.

Accordingly, in an aspect the invention relates to a method for the production of a hulupones product comprising carrying out the oxidation of lupulones thereby forming hulupones and one or more lupulones oxidation side-products in an alcoholic medium (e.g. only ethanol, or ethanol or another alcohol mixed with water) or another organic solvent medium (but typically no hydrocarbon or halogenated organic solvents) such as acetic acid (acid solvent) or ethyl acetate (ester solvent), in the presence of one or more alkaline earth metal cations, typically introduced as complexes or salts, and optionally in the presence of one or more alkali metal bases or salts. As an alternative to alkaline earth metal cations, other multivalent cations can be applied, e.g. copper complexes or salts. In this aspect, the alcoholic medium preferably comprises at least 50 volume % alcohol, more preferably at least 75 volume % alcohol, most preferably the solvent medium essentially consists of alcohol. Particularly preferred the alcohol is ethanol.

Further, the invention relates to a method comprising carrying out the oxidation of lupulones in an organic solvent medium, preferably an alcoholic medium, more preferably an ethanolic medium, most preferably an ethanolic medium with at least 50 volume % ethanol, in particular and ethanolic medium with at least 75 volume % ethanol, most preferably an all ethanolic solvent medium, with preferably an initial lupulones content between 0.5 and 50 weight % and with preferably an initial molar ratio of alkaline earth metal cations to lupulones in the range of 0.1 to 10. Herein the alkaline earth metal cation is preferably provided in the organic solvent medium as an alkaline earth metal complex or salt, more preferably as an alkaline earth metal salt at least partially soluble in the organic solvent medium. Such method is in particular advantageous carried out as part of a method for the production of a hulupones product according to the invention wherein the lupulones oxidation takes place in an alcoholic medium, in particular in an ethanolic medium comprising preferably at least 50 volume % ethanol, more preferably at least 75 volume % ethanol, most preferably the ethanolic medium essentially consists of ethanol.

Advantageously, said method comprises removing at least partially the organic solvent from the oxidation mixture or medium in which the oxidation of the lupulones is carried out, for example by means of evaporation or distillation to concentrate or separate a phase comprising alkaline earth metal hulupates and optionally alkali metal hulupates. Alternatively, separation of a phase comprising alkaline earth metal hulupates and optionally also alkali metal hulupates can be achieved by adding (deionized) water, resulting in the formation of a separate phase comprising hulupones as alkaline earth metal hulupates and optionally as alkali metal hulupates.

Advantageously, said method comprises transforming the alkaline earth metal hulupates and optionally the alkali metal hulupates obtained from the lupulones oxidation in the organic solvent medium into hulupones in the free acid form.

Advantageously, the alkaline earth metal hulupates and optionally the alkali metal hulupates are transformed into hulupones in the free acid form by subjecting the alkaline earth metal hulupates and optionally the alkali metal hulupates to an acidification.

Advantageously, the obtained hulupones are dissolved in an aqueous medium or an alcoholic medium, preferably as alkali metal salts.

Accordingly, in an aspect the invention relates to a method for the production of a hulupones product comprising dissolving hulupones from a precipitated phase comprising hulupones in the free acid form into an aqueous medium whereas possibly remaining lupulones and one or more lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones remain precipitated.

Further, the invention relates to a method comprising dissolving the hulupones by extraction with an aqueous medium whereas possibly remaining lupulones and one or more lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones remain precipitated.

Advantageously, said method comprises dissolving the hulupones by selective extraction with an aqueous medium with preferably a pH in the range of 3-7, more preferably in the range of 4-5, most preferably 4-4.5, whereas lupulones and one or more lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones remain precipitated.

Advantageously, said method comprises increasing the pH of the aqueous medium comprising hulupones, obtained by separating the hulupones from the remaining precipitate phase, comprising possibly remaining lupulones and lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, by aqueous extraction, to a pH in the range of 8-12.

In a further aspect, the invention relates to a method for the production of a hulupones product comprising an adsorption process wherein an aqueous or organic solvent (for example ethanol) medium comprising lupulones and/or hulupones and one or more hop oil compounds is contacted with an activated carbon adsorbent whereby one or more hop oil compounds are at least partially removed from the aqueous or organic solvent medium comprising lupulones and/or hulupones. Such method is advantageously combined with a method for the production of a hulupones product according to the present invention.

Advantageously, the method according to the invention comprising an adsorption process comprises adsorbing at least partially the hop oil compounds (or the hop oil compound) to a non-acidic activated carbon, preferably a non-acidic activated carbon with macropores.

In a further aspect, the invention relates to a method for the production of a hulupones product comprising an ion-exchange process wherein an aqueous medium, preferably an aqueous acidic medium, or more preferably an organic solvent medium comprising lupulones and/or hulupones and one or more short-chain fatty acid compounds selected from the group of 2-methyl-propanoic acid, 3-methyl-butanoic acid and 2-methyl-butanoic acid is contacted with an anion-exchanger, preferably a weak base anion-exchanger, whereby one or more short-chain fatty acid compounds, selected from the group of 2-methyl-propanoic acid, 3-methyl-butanoic acid and 2-methyl-butanoic acid, are at least partially removed from the medium comprising lupulones and/or hulupones. Such method is advantageously combined with a method for the production of a hulupones product according to the present invention.

In a further aspect, the invention relates to a hulupones product, obtainable by a method of the invention, suitable as a bittering preparation for addition during the brewing process in the production of beer.

In a further aspect, the invention relates to a hulupones product with a low fraction of compounds relative to the hulupones present or essentially free of compounds, formed as side-products during the lupulones oxidation, that can cause negative impact upon brewing application of the hulupones product for beer bittering in terms of aroma, taste or haze, suitable as a bittering preparation in the production of beer.

In a further aspect, the invention relates to a hulupones product with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones below 40.0 weight %, preferably below 20.0 weight %, more preferably below 10.0 weight %, most preferably below 5.0 weight %, relative to the mass of hulupones present.

Advantageously, said hulupones product has a mass fraction of 5-(3-methyl-2-butenyl)-isohumulones below 20.0 weight % relative to the mass of hulupones present, preferably below 10.0 weight %, more preferably below 5.0 weight %, most preferably below 1.0 weight %.

Advantageously, said hulupones product has a mass fraction of lupulones derivatives with a retained six-membered ring from the original lupulones with a molecular weight higher than the lupulones below 20.0 weight % relative to the mass of hulupones present, preferably below 10.0 weight %, more preferably below 5.0 weight %, most preferably below 1.0 weight %.

Advantageously, said hulupones product has a mass fraction of bi- and tricyclic lupulones derivatives with a retained six-membered ring from the original lupulones below 20.0 weight % relative to the mass of hulupones present, preferably below 10.0 weight %, more preferably below 5.0 weight %, most preferably below 1.0 weight %.

Advantageously, said hulupones product has a summed mass fraction of hulupinic acid, dihydro-hulupones, hydroxy-hulupones, epoxy-hulupones and bicyclic hulupones derivatives with a retained five-membered ring as the ring of the hulupones below 20.0 weight % relative to the mass of hulupones present, preferably below 10.0 weight %, more preferably below 5.0 weight %, most preferably below 1.0 weight %.

Advantageously, said hulupones product has a summed mass fraction of dihydro-hulupones and hydroxy-hulupones below 20.0 weight % relative to the mass of hulupones present, preferably below 10.0 weight %, more preferably below 5.0 weight %, most preferably below 1.0 weight %.

Advantageously, said hulupones product has a summed mass fraction of 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones below 20.0 weight % relative to the mass of hulupones present, preferably below 10.0 weight %, more preferably below 5.0 weight %, most preferably below 1.0 weight %.

Advantageously, said hulupones product has a summed mass fraction of 2-methyl-propanoic acid, 3-methyl-butanoic acid and 2-methyl-butanoic acid below 2.0 weight % relative to the mass of hulupones present, more preferably below 0.5 weight %, most preferably below 0.1 weight %.

In a preferred embodiment, said hulupones product is a matter comprising hulupones in the free acid form.

In a preferred embodiment, said hulupones product is an aqueous solution of alkali metal salts of hulupones, with preferably a hulupones content of 1.0 to 40.0 weight %.

In a preferred embodiment, said hulupones product is a solution of hulupones, in the free acid form or as a complex or salt, in ethanol or propylene glycol, with preferably a hulupones content of 1.0 to 50.0 weight %.

In particular, the invention provides a hulupones product, suitable for use as a bittering preparation for addition during the brewing process in the production of beer, with a reduced tendency or even the absence of contributing to haze or rancid aroma or causing light-struck off-flavour (skunky thiol aroma), compared to hulupones products, such as obtained according to the prior art discussed herein above.

Accordingly, in an aspect the invention relates to a method of bittering a beverage, in particular a beer, comprising the use of a hulupones product according to the invention, preferably a hulupones product with a low fraction of compounds relative to the hulupones present or essentially free of compounds, formed as side-products during the lupulones oxidation, that can cause negative impact upon brewing application of the hulupones products for beer bittering in terms of aroma, taste or haze, as a bittering preparation.

Accordingly, in an aspect the invention relates to a method of bittering a beverage, in particular a beer, comprising the use of a hulupones product according to the invention, preferably a hulupones product with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, and lupulones below 40 weight %, preferably below 20 weight %, more preferably below 10 weight %, most preferably below 5 weight %, relative to the mass of hulupones present, as a bittering preparation.

Advantageously, said method comprises the use of a hulupones product according to the invention, preferably a hulupones product with a mass fraction of 5-(3-methyl-2-butenyl)-isohumulones below 20.0 weight % relative to the mass of hulupones present, preferably below 10.0 weight %, more preferably below 5.0 weight %, most preferably below 2.0 weight %.

Advantageously, said method comprises the use of a hulupones product according to the invention, preferably a hulupones product with a mass fraction of lupulones derivatives with a retained six-membered ring from the original lupulones with a molecular weight higher than the lupulones below 20.0 weight % relative to the mass of hulupones present, preferably below 10.0 weight %, more preferably below 5.0 weight %, most preferably below 2.0 weight %.

Advantageously, said method comprises the use of a hulupones product according to the invention, preferably a hulupones product with a mass fraction of bi- and tricyclic lupulones derivatives with a retained six-membered ring from the original lupulones below 20.0 weight % relative to the mass of hulupones present, preferably below 10.0 weight %, more preferably below 5.0 weight %, most preferably below 2.0 weight %.

Advantageously, said method comprises the use of a hulupones product according to the invention, preferably a hulupones product with a summed mass fraction of 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones below 20.0 weight % relative to the mass of hulupones present, preferably below 10.0 weight %, more preferably below 5.0 weight %, most preferably below 2.0 weight %.

Advantageously, said method comprises the use of a hulupones product according to the invention, preferably a hulupones product with a summed mass fraction of 2-methyl-propanoic acid, 3-methyl-butanoic acid and 2-methyl-butanoic acid below 2.0 weight % relative to the mass of hulupones present, more preferably below 0.5 weight %, most preferably below 0.1 weight %.

Accordingly, in an aspect the invention relates to a method of bittering a beverage, in particular a beer, comprising the use of a hulupones product according to the invention, preferably a hulupones product with a summed mass fraction of 5-(3-methyl-2-butenyl)-isohumulones, lupuloxinic acid, (dehydro)lupulenol, lupulones derivatives with a retained six-membered ring from the original lupulones with a molecular weight higher than the lupulones, and bi- and tricyclic lupulones derivatives with a retained six-membered ring from the original lupulones below 20.0 weight % relative to the mass of hulupones present, preferably below 10.0 weight %, more preferably below 5.0 weight %, most preferably below 2.0 weight %, and a summed mass fraction of 2-methyl-propanoic acid, 3-methyl-butanoic acid and 2-methyl-butanoic acid below 2.0 weight % relative to the mass of hulupones present, more preferably below 0.5 weight %, most preferably below 0.1 weight %.

In a preferred embodiment, said hulupones product is added prior to the (primary) fermentation stage of the brewing process, preferably to the (boiling) wort.

In a further preferred embodiment, said hulupones product is added after the (primary) fermentation stage of the brewing process.

Definitions

Unless defined otherwise, all technical and scientific terms used herein have the same meaning as commonly understood by one of ordinary skill in the art.

The term "or" as used herein means "and/or" unless specified otherwise.

The term "a" or "an" as used herein means "at least one" unless specified otherwise.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95% of the maximum of that feature.

The term "about" in relation to a value generally includes a range around that value as will be understood by the skilled person. In particular, the range is from at least 15% below to at least 15% above the value, more in particular from 10% below to 10% above the value, more specifically from 5% below to 5% above the value.

When referring to "hulupones", this includes not only hulupones wherein two side-chains contain an unsaturated carbon-carbon bond, but also hulupones with one or two of those side-chains saturated.

When referring to a "noun" (e.g. a compound, etc.) in singular, the plural is meant to be included, unless specified otherwise.

When referring to "pH", the apparent pH is meant, measurable with a calibrated pH electrode.

For the purpose of clarity and a concise description, features are described herein as part of the same or separate embodiments, however, it will be appreciated that the scope of the invention may include embodiments having combinations of all or some of the features described.

DETAILED DESCRIPTION OF THE INVENTION

Herein below various particularly suitable and preferred aspects of (the method of) the invention are described in further detail. Although several details about suitable processes and obtainable products are described in combination, the skilled person will also be able—in line with the Claims and the Summary of the Invention—to apply one or more of the details separate from each other.

For the production of hulupones products, suitable as beer bittering preparations, in principle any lupulones containing starting material may be used, e.g. any commercially available lupulones solution.

The lupulones used for the production of the hulupones can be obtained in any manner from a lupulones containing matter, preferably a hop extract (such as produced by applying $CO_2$ extraction) comprising lupulones. Aqueous alkaline solutions of lupulones are commercially available (typically with about 10 weight % lupulones), and are usually produced from (isomerized) hop extracts using methods to separate the lupulones from other hop acids, such as humulones and isohumulones, by for example aqueous pH variation based aqueous fractionation, and from the hop oils, such as hop monoterpenes and sesquiterpenes, by means of for example (selective) evaporation or distillation. Such aqueous lupulones solutions can also be produced specifically as process feed or starting material for the production of hulupones as such from (isomerized) hop extracts by applying such fractionation and separation methods.

Analysis of the commercially available lupulones solutions learnt that besides lupulones, also hop oil compounds (predominantly myrcene and humulene) were present in the lupulones solutions that were analyzed. Further analysis revealed also the presence of short-chain fatty acids (such as 2-methyl-propanoic acid, 3-methyl-butanoic acid and 2-methyl-butanoic acid), with contents varying between 0.1 and 0.5 weight % relative to the mass of lupulones present in the majority of these lupulones solutions. In some of the analyzed lupulones solutions, also a low content of other hop acids different from lupulones, such as isohumulones, was found, together with a small fraction of lupulones oxidation products (e.g. lupuloxinic acid, (dehydro)lupulenol and tricyclic lupulones derivatives with a retained six-membered ring from the original lupulones) and some hop acid degradation products (in particular deacylated hop acids).

The present invention enables to obtain hulupones products, in particular hulupones products of high purity and quality, which upon use in the brewing process to impart bitter taste, have no unintended, undesirable or unacceptable impact, in particular in terms of aroma, taste and haze. Depending on the composition of the lupulones containing starting product, more specifically its content of compounds with potential negative impact in terms of aroma, taste or haze, one or more types of processing further described herein can be used to enable the production of the hulupones products of high purity and quality suitable for beer bittering.

The aqueous alkaline solutions of lupulones used in a method according to the invention (usually varying between 1 and 30 weight % lupulones) can be contacted with an activated carbon adsorbent to reduce the level of hop oil compounds. Other known adsorbent types were tested, thereby assessing and evaluating the removal of hop oil compounds (typically unsaturated hydrocarbons, in particular mono- and sesquiterpenes), but these proved to be less effective compared to activated carbons. Other methods were also tested for removal of the hop oils, such as atmospheric boiling and (vacuum) distillation, but these methods proved to be less efficient to achieve (very) low levels of the hop oil compounds in the aqueous lupulones solutions.

In the analyzed commercially available lupulones solutions, hop oil contents varying between 0.1 and 1.5 weight % relative to the mass of lupulones present were found. Adsorption of the hop oil compounds on an activated carbon by adding the activated carbon to the aqueous lupulones solution followed by removal of the activated carbon after the adsorption process (for example by filtration), enabled to reduce the presence of hop monoterpenes (for example myrcene) with a factor up to 100, and of the hop sesquiterpenes (for example humulene) with a factor up to 20.

Activated carbon materials with non-acidic properties are preferred, in particular non-acidic macroporous activated carbons. Good results have in particular been achieved with such non-acidic activated carbons having macropores, in contrast with acidic activated carbon materials.

The removal of the hop oil compounds (from the aqueous alkaline lupulones solution) is preferably performed at this stage of the hulupones production, as the hop oil compounds are in this stage predominantly present as hydrocarbons; after the oxidation process, a larger fraction of the hop oil compounds can be present as oxygenated compounds, which can reduce the efficiency of the adsorption on the activated carbon.

The adsorption stage involving the activated carbon for the removal of hop oil compounds can be applied at another stage of the processing, or can be combined with another process stage.

Alternatively, the adsorption step involving the activated carbon for the removal of hop oil compounds can be performed in an organic solvent medium comprising lupulones and hop oil compounds, for example an ethanolic solution of lupulates.

Alternatively, the adsorption step involving the activated carbon for the removal of hop oil compounds can also be performed on a solution of hulupones or hulupates instead of solutions of lupulones or lupulates.

This adsorption step is optional, and not required if the lupulones process feed for the hulupones production is already low enough in or (essentially) free of hop oil compounds.

The hop oil content of the lupulones solutions is preferably reduced as the hop oil compounds, whether or not (oxidatively) transformed in the further processing stages, can unintentionally or undesirably impact the aroma properties or characteristics of the brewing products to which the obtained hulupones product (for the bitter taste effect) is added, given the low aroma threshold values of various hop oil compounds, in particular of hop oil (oxygenated) monoterpenoids.

The aqueous lupulones solution is optionally further processed (in order to obtain an aqueous lupulones solution, suitable for the oxidation process, with a controlled mass content of lupulones and molar ratio of alkali metal cations to lupulones) by reducing the pH from the typical initial value (pH about 10-11), optionally by dilution, to a lower pH (for example between 1 and 7, preferably between 3 and 5, more preferably between 3 and 4) to efficiently obtain the lupulones as a separate phase, whereas the short-chain fatty acids remain in the aqueous phase, which can be decanted. This stage enables to obtain, optionally after additional washing of the separated phase comprising lupulones with for example (deionized) water after the decantation step, a purified lupulones matter with a low content of or even essentially free of short-chain fatty acids such as 2-methyl-propanoic acid, 3-methyl-butanoic acid and 2-methyl-butanoic acid, which is desirable given the negative aroma impact of such compounds (i.e. rancid aroma) in brewing products even at very low addition levels.

Alternatively, the aqueous lupulones solution is optionally processed by reducing the pH to for example a pH in the range of 1-3. Usually, the aqueous lupulones solution first turns into a suspension (phase separation) with gradual precipitation of lupulones. Typically, a clear supernatant phase is obtained with a pH of about 4 to 5. Analysis of the supernatant phase showed that >99% of the lupulones can be precipitated in that way. Next, the precipitate phase comprising lupulones is separated by decantation of the supernatant phase and the precipitate phase is optionally washed with for example (deionized) water, and typically the obtained precipitate phase is essentially free of short-chain fatty acids such as 2-methyl-propanoic acid, 3-methyl-butanoic acid and 2-methyl-butanoic acid.

Typically, the separated lupulones phase is then contacted with (deionized) water and next an aqueous solution of alkali metal base (e.g. potassium hydroxide) is gradually added (preferably 1.5-2 molar equivalents of potassium cations versus the (initial) lupulones content, usually the molar ratio of potassium hydroxide (or another suitable alkali metal base) versus the (initial) lupulones content is in the range of 1-3) while mixing and keeping the mixture at a temperature preferably above 40° C. (to lower the viscosity of the initially separated lupulones phase and enhance the dissolution of the lupulones) to obtain for example a 1 to 40 weight %, but typically a 2.5 to 25 weight % aqueous alkaline solution of lupulones, with typically a pH of about 11 to 13.

Alternatively, for example an aqueous lupulones concentrate (with for example about 50 weight % lupulones) can be prepared by adding a concentrated aqueous alkali metal base solution (for example an about 50 weight % potassium hydroxide solution) to the aforementioned separated lupulones phase, applying for example a potassium hydroxide to lupulones molar ratio of about 1. The higher mass content of lupulones enables to increase the productivity of the oxidation process to obtain hulupones from lupulones.

The oxidation process to transform lupulones into hulupones in aqueous alkaline medium can be catalyzed (e.g. with heterogeneous palladium or platinum catalysts) or non-catalyzed, preferably the aqueous lupulones oxidation is performed in the absence of catalysts.

In the lupulones oxidation typically molecular oxygen (for example as pure oxygen or as air) is used as the oxidant. Oxygen can be supplied under pressure (for example 2-50 bar $O_2$ (partial) pressure), or alternatively at for example atmospheric pressure by means of a porous diffuser. Usually, the lupulones oxidation is stopped after consumption of less than 1.5 molar equivalent of molecular oxygen, preferably after consumption of about 1 molar equivalent of molecular oxygen relative to the lupulones (to be oxidatively transformed) initially present.

For example, an aqueous solution comprising lupulones, e.g. the aforementioned aqueous lupulones solution comprising about 25 weight % lupulones, can be introduced in a reactor which is then pressurized (typically with a partial pressure of oxygen in the range of 2-50 bar) with molecular oxygen (or an oxygen containing gas) for the oxidative transformation of lupulones and brought to an increased process temperature (usually in the range of 25-100° C., preferably in the range of 75-95° C.), while mixing the process mixture by stirring, and kept under these process conditions for typically 30-300 min, preferably between 90 and 210 min. The decrease in lupulones content was monitored, and >95% of the lupulones were usually transformed upon consumption of 1 molar equivalent of molecular oxygen (relative to the initial lupulones content). A mass based hulupones yield (at the end of the lupulones oxidation process) of 60% and higher can be achieved under optimized conditions for the oxidation process.

Alternatively, a reactor holding an aqueous 50 weight % lupulones concentrate was pressurized with oxygen (for example between 10 to 50 bar) and kept at increased process temperature (typically in the range of 40-90° C., preferably in the range of 50-70° C.) while stirring for typically 30-360 min, optimally between 90 and 240 min. Again, >95% of the lupulones is usually transformed upon consumption of 1 molar equivalent of $O_2$. Under optimal conditions, a mass based hulupones yield of about 50% proved achievable.

For example, to the process mixture obtained from the oxidation starting from the aqueous 25 weight % lupulones solution can be added, most conveniently after release of the oxygen pressure, an alkali metal salt such as potassium sulfate or an alkaline earth metal compound, such as magnesium sulfate, while mixing. The use of alkaline earth metal compounds (typically as a co-addition) usually results in a more efficient separation and higher recoveries of hulupones, at lower (molar) equivalents (versus the initial (molar) content of lupulones or the (molar) content of formed hulupones) added compared to alkali metal compounds. Optionally, the pH of the aqueous process mixture can be lowered to a slightly acidic pH (for example about 6) to promote the precipitation of the hulupate salts, however this may cause co-precipitation of short-chain fatty acids. After cooling, to for example 70° C., a two-phase process mixture is obtained, with a separate phase enriched in hulupones and an aqueous supernatant phase comprising amongst others short-chain fatty acids (such as 2-methyl-propanoic acid, 3-methyl-butanoic acid and 2-methyl-butanoic acid) formed during the oxidation process or remaining from the starting lupulones solution, but depleted in hulupones. The aqueous supernatant phase can then be separated (for example by decantation) and the precipitated phase (comprising alkali metal hulupates and optionally alkaline earth metal hulupates, also comprising lupulones oxidation side-products such as lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, and possibly remaining lupulones) can subsequently be washed with (deionized) water or with a (saturated) aqueous alkali metal or alkaline earth metal salt solution, such as a saturated aqueous potassium sulfate solution.

The lupulones oxidation side-product formation and distribution determined in the obtained hulupones product phase resembles to some extent to the process mixture composition obtained in U.S. Pat. No. 4,340,763, however a smaller fraction of 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones is formed, as well as a smaller summed fraction of lupuloxinic acid, lupulenol and dehydrolupulenol (compared to U.S. Pat. No. 4,717,580), with as a result a higher portion of the desired hulupones in the product distribution.

Addition of this hulupones product phase comprising alkali metal hulupates dissolved in food-grade ethanol to unhopped beer imparted an agreeable bitter taste to the beer but also caused the presence of haze (because of the presence of (dehydro)lupulenol, lupulones derivatives with a retained six-membered ring from the original lupulones with a molecular weight higher than the lupulones, and bi- and tricyclic lupulones derivatives with a retained six-membered ring from the original lupulones) in the bittered beer and the occurrence of light-struck off-flavour (related to the presence of 5-(3-methyl-2-butenyl)-isohumulones) upon exposure of the bittered beer to (visible) light.

In a highly advantageous method of the invention, a precipitated phase comprising hulupones, typically as alkali metal hulupates (and optionally also as alkaline earth metal hulupates), obtained after decantation of the supernatant phase and optional washing, is contacted with (deionized) water and the pH of the obtained mixture is, while mixing, reduced to preferably a pH value of 6 or less, more preferably 3 or less (but preferably of 1 or more) by for example addition of an aqueous solution of an acid, usually an inorganic acid such as sulfuric acid or another strong inorganic acid. This is usually done while mixing the process mixture at a moderate temperature, for example between 40 and 80° C., followed by further cooling after stopping the agitation. The supernatant phase is then removed (for example by decantation).

Next, (deionized) water is added to the precipitated phase comprising hulupones in the free acid form. The pH of the aqueous mixture is then increased, for example by addition of an aqueous solution of potassium hydroxide (or another alkali metal base), to a pH usually in the range of 3 to 7, preferably between 4 and 5, more preferably between 4 and 4.5, to obtain an aqueous solution of hulupones, typically in the form of their potassium salts (if potassium hydroxide is used), essentially free of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones. In the remaining precipitated phase, side-products of the lupulones oxidation, such as 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, and in some case remaining unreacted lupulones, can be found.

After separation, e.g. by decantation, of the aqueous supernatant phase comprising hulupones from the remaining precipitated phase, the pH of this hulupones comprising aqueous phase is brought to a higher pH value, preferably to a pH of 8 or more, preferably less than 12. Thus a clear solution of alkali metal hulupates is obtained. This clear solution of hulupones is particularly suitable as a bittering preparation for beer bittering.

This process to separate the hulupones product, and to obtain a hulupones product of high purity and quality, involving first a precipitation of hulupones as alkali metal salts and optionally also as alkaline earth metal salts, with removal of the aqueous supernatant phase, followed by an acidification to a low pH value to obtain a precipitate phase comprising hulupones in the free acid form, followed by selective extraction or dissolution of the hulupones from the precipitated phase at increased pH (in the salt form), proved superior compared to a process involving a single acidification to an intermediate pH, which resulted in lower hulupones recoveries and lower product purities.

Optionally, the obtained clear hulupones solution can (again) be contacted with an activated carbon, preferably a non-acidic activated carbon, more preferably a macroporous non-acidic activated carbon, to reduce the content of remaining residual hop oil compounds and limit their presence, or to remove the hop oils quantitatively.

Optionally, a medium or mixture, either aqueous, preferably aqueous acidic, or organic, preferably ethanolic, comprising lupulones and/or hulupones and short-chain fatty acid compounds, for example 2-methyl-propanoic acid, 3-methyl-butanoic acid and 2-methyl-butanoic acid, is contacted with an anion-exchanger to remove at least partially the short-chain fatty acids from the medium or mixture comprising lupulones and/or hulupones, for example by adsorption of the short-chain fatty acids on a weakly basic anion-exchanging resin. Purified media or mixtures comprising lupulones and/or hulupones are obtained by decantation of the liquid supernatant phase.

For the oxidation of lupulones to hulupones in an alcoholic medium, preferably an ethanolic medium, usually a matter comprising lupulones in the free acid form, typically a lupulones extract or concentrate, preferably dried or dry, preferably essentially free of hop oil compounds and short-chain fatty acids, is dissolved, while mixing, in the alcohol, such as ethanol, for example at ambient temperature, with optional addition of alkali metal base such as potassium hydroxide, with for example a potassium hydroxide to lupulones molar ratio of about 1. It was observed that the effect of too high potassium hydroxide to lupulones molar ratios can be an increased formation of hulupones derivatives (such as hydroxy-hulupones and epoxy-hulupones), while a too low ratio can result in an increased fraction of lupulones oxidation side-products, for example bicyclic lupulones derivatives with a retained six-membered ring from the original lupulones.

This is typically followed by providing to the ethanolic medium alkaline earth metal cations, typically by addition of magnesium chloride, either added as a powder or as a solution, while mixing resulting in molar ratio of magnesium cations to lupulones of for example about 1. Alternatively, magnesium cations can be contacted with lupulones in for example an aqueous mixture thereby forming magnesium lupulates with also the formation of a separate phase comprising magnesium lupulates, which can after separation from the aqueous medium by decantation be introduced to the alcoholic (ethanolic) medium for the lupulones oxidation.

Next, the obtained mixture is transferred into a reactor vessel, which is then pressurized with gaseous oxygen while heating to and keeping at for example 60° C., and typically the oxidation process is stopped upon consumption of one molar equivalent of molecular oxygen relative to the amount of initially present lupulones to be transformed.

Typically, a phase comprising hulupones was obtained after (partial) removal of the alcohol solvent, by for example evaporation or by precipitation upon addition of (deionized) water. In the latter case, the liquid supernatant phase comprising i.a. water, ethanol and some oxidized ethanol derivatives (such as acetic acid) was removed by decantation.

Further processing of the obtained phase comprising hulupones, for example to further purify the obtained phase comprising hulupones, was performed according to other methods (for example transformation into hulupones in the free acid form, and selective aqueous extraction or dissolution as alkali metal hulupates) described above.

EXAMPLES

Example 1

Production of Hulupones by Oxidation of Lupulones in Aqueous Process Medium at High Concentration and at High Oxygen Pressure Typically, commercially available aqueous alkaline lupulones solutions (usually containing about 10 weight % lupulones) were used as starting material for the production of hulupones. However, these lupulones solutions often contain also traces of i.a. short-chain fatty acids and hop oil compounds. For example, analysis of a LupuStab® batch, obtained from BetaTec, revealed the presence of e.g. 0.31 weight % 2-methyl-propanoic acid, 0.34 weight % 3-methyl-butanoic acid, 0.15 weight % 2-methyl-butanoic acid, 0.39 weight % monoterpenes and 0.67 weight % sesquiterpenes, expressed relative to the mass of lupulones present in a batch sample.

1.1. Pretreatment

The content of hop oil compounds, predominantly present as unsaturated hydrocarbons, in particular mono- and sesquiterpenes such as myrcene, humulene and caryophyllene, in the aqueous alkaline lupulones solution (e.g. LupuStab®) was reduced by adsorption on a macroporous, non-acidic activated carbon (e.g. Desotec Organosorb® 10-AA).

To that end, a 1 L processing vessel was charged with 500 mL LupuStab® (containing about 50 g lupulones) and 5 or 25 g Organosorb® 10-AA, corresponding to an adsorbent loading of 0.1 or 0.5 g/g lupulones. After stirring the suspension at ambient temperature for 1 to 5 h, and after removal of the adsorbent by filtration, the content of hop oil monoterpenes was reduced to <1% and the content of hop oil sesquiterpenes was reduced to <5%, expressed relative to the initial content of respectively mono- and sesquiterpenes (prior to the adsorptive removal).

Next, the obtained aqueous lupulones solution (500 mL), held in a 1 L vessel, was diluted with 250 mL deionized water and gradually acidified, by addition of an aqueous sulfuric acid solution (e.g. 6 M) while mixing (to induce a pH reduction of the aqueous phase from about 10-11 to about 3-5). The aqueous lupulones solution turned into a suspension, and the formation of a separate phase was observed. After standing overnight, a clear supernatant phase was obtained (typically with a pH value of about 3-5) and analysis showed that <1% of the lupulones present in the aqueous medium prior to the acidification remained in the liquid supernatant phase after the phase separation. The phase comprising lupulones was separated by decantation of the aqueous supernatant phase, and washed twice with 100 mL deionized water. Analysis of the obtained separate phase comprising lupulones showed that it was essentially free of the short-chain fatty acids 2-methyl-propanoic acid, 3-methyl-butanoic acid and 2-methyl-butanoic acid, originally present in the lupulones containing starting material.

Afterwards, 50 mL deionized water was added to the processing vessel and the suspension was mixed while heating to about 70° C. The lupulones were solubilized and dissolved by addition of an aqueous potassium hydroxide solution (e.g. 1 M), corresponding to a potassium hydroxide to lupulones molar ratio of typically 1.5-2, to the suspension while stirring at 70° C. The mixing was stopped once the suspension turned into a clear solution. Finally, deionized water was added to adjust the mass concentration of lupulones to 25 weight %, and the pH of the obtained aqueous alkaline lupulones solution was typically 12-13.

1.2. Oxidation

The oxidation process was performed in a 1 L stainless steel high-pressure batch reactor equipped with a mechanical stirrer. The reactor was charged with 600 mL of the aqueous alkaline 25 weight % lupulones solution obtained after the adsorptive removal of hop oil compounds, sealed and purged with gaseous nitrogen.

The process mixture was stirred at 600 rpm and heated to about 80-85° C. When the reaction temperature was reached, the reactor was charged with gaseous oxygen at about 20 bar while keeping the temperature at about 80-85° C. The process time was about 120 min.

The oxidation was stopped after consumption of 1 molar equivalent of molecular oxygen (relative to the initial amount of lupulones to be transformed) by venting the reactor and purging with gaseous nitrogen, followed by cooling the reactor to about 70° C.

Analysis showed that the obtained aqueous process mixture comprised, apart from the desired hulupones, also short-chain fatty acids and other lupulones oxidation side-products (i.a. 5-(3-methyl-2-butenyl)-isohumulones, and to a lesser extent also lupulones derivatives with a retained six-membered ring from the original lupulones with a molecular weight higher than the lupulones, lupuloxinic acid, (dehydro)lupulenol, bi- and tricyclic lupulones derivatives with a retained six-membered ring from the original lupulones, dihydrohulupones and hulupinic acid).

The mass contents of 2-methyl-propanoic acid, 3-methyl-butanoic acid and 2-methyl-butanoic acid were respectively 0.58 weight %, 0.50 weight % and 0.44 weight %, expressed relative to the mass of hulupones obtained.

This aqueous process medium comprising hulupones was added during the wort boiling stage and also after the fermentation stage of the brewing process, for organoleptic evaluation.

1.3. Purification

The obtained aqueous process mixture comprising a.o. hulupones was further treated to effectuate the removal of short-chain fatty acids and lupulones oxidation side-products (a. o. 5-(3-methyl-2-butenyl)-isohumulones, lupulones derivatives with a retained six-membered ring from the original lupulones with a molecular weight higher than the lupulones, lupuloxinic acid, (dehydro)lupulenol, bi- and tricyclic lupulones derivatives with a retained six-membered ring from the original lupulones, dihydrohulupones and hulupinic acid), in order to obtain purified hulupones matters essentially free of 2-methyl-propanoic acid, 3-methyl-butanoic acid, 2-methyl-butanoic acid, 5-(3-methyl-2-butenyl)-isohumulones, lupulones derivatives with a retained six-membered ring from the original lupulones with a molecular weight higher than the lupulones, lupuloxinic acid, (dehydro)lupulenol, bi- and tricyclic lupulones derivatives with a retained six-membered ring from the original lupulones and dihydro-hulupones. The latter can then be added after the fermentation stage of the brewing process to impart beer bitterness, without the risk of causing rancidity, haze or light-struck off-flavour (skunky thiol aroma).

The pH of the aqueous oxidation process mixture typically dropped to about 8-9 at >99% lupulones conversion. The oxidation of lupulones was typically performed with a potassium hydroxide to lupulones molar ratio of about 1.5-2, hence with a molar excess of potassium cations. A fraction of the hulupones and lupulones oxidation side-products already precipitated under these conditions. By further increasing the alkali metal content of the aqueous mixture, for example by addition of potassium sulfate, alkali metal induced precipitation of hulupones and lupulones oxidation side-products out of the aqueous process mixture or medium was exerted, which enabled an efficient separation of the hulupones formed during the oxidation process, whereas the short-chain fatty acids remained in the aqueous supernatant phase. Optionally, the pH of the aqueous process mixture can be lowered to promote the formation of the precipitating phase and increase the precipitation of the hulupones, for example from 8-9 to about 6, but this can cause that a fraction of the short-chain fatty acids can become part of the precipitated phase comprising hulupates.

A higher recovery of hulupones was obtained by increasing the potassium content of the aqueous process mixture. To that end, for example an additional one molar equivalent of potassium ions (relative to the initial amount of processed lupulones) was added as potassium sulfate to the aqueous process mixture or medium and the obtained mixture or medium was stirred at about 70° C. for 15 min. Afterwards, the agitation was stopped and the aqueous process mixture or medium was cooled down to ambient temperature to induce the precipitation of the separate phase comprising a.o. hulupones in the potassium salt form.

Alternatively, potassium sulfate can be added to the alkaline aqueous 25 weight % lupulones solution at the onset of the oxidation process. The recovery of hulupones from the aqueous process mixture was similar in both cases, but the transfer of the aqueous process mixture from one vessel to another proved more practical in the latter approach. However, a>99% recovery of hulupones was found hard to achieve by applying only alkali metal salts to effectuate the precipitation of hulupones; co-addition of alkaline earth metal salts (e.g. magnesium sulfate) proved to be more efficient.

Afterwards, the liquid supernatant phase comprising a.o. 2-methyl-propanoic acid, 3-methyl-butanoic acid and 2-methyl-butanoic acid, and inorganic salts (for example potassium sulfate) was removed by decantation. The separate phase comprising a.o. hulupones in the potassium salt form was washed twice with either 250 mL deionized water, or 250 mL of a saturated aqueous potassium sulfate solution.

The precipitated phase comprising hulupones and lupulones oxidation side-products (a.o. 5-(3-methyl-2-butenyl)-isohumulones, and to a lesser extent also lupulones derivatives with a retained six-membered ring from the original lupulones with a molecular weight higher than the lupulones, lupuloxinic acid, (dehydro)lupulenol, bi- and tricyclic lupulones derivatives with a retained six-membered ring from the original lupulones, dihydrohulupones and hulupinic acid) was contacted with 250 mL deionized water, and typically a pH value of about 7-8 was observed. The suspension was stirred while heating to and keeping at about 70° C. The suspension was acidified to a pH of about 2 by gradually adding an aqueous sulfuric acid solution (e.g. 6 M), aiming at a>99% precipitation of the hulupones and lupulones oxidation side-products. After about 15 min, the agitation was stopped and the process mixture was cooled down to ambient temperature. The liquid supernatant phase comprising a.o. inorganic salts was removed by decantation.

Afterwards, 250 mL deionized water was added to the obtained precipitate phase comprising hulupones in the free acid form and also lupulones oxidation side-products, and a suspension was obtained by stirring and heating to 95° C. The pH was adjusted to about 4-4.5 by the addition of an aqueous potassium hydroxide solution (e.g. 1 M) in order to dissolve hulupones while keeping the lupulones oxidation side-products precipitated. After about 15 min, the agitation was stopped and the process mixture was cooled down to ambient temperature, and the liquid supernatant phase comprising a.o. hulupones and hulupinic acid in the potassium salt form was separated by decantation.

Analysis showed that there is a trade-off in the selective fractionation of hulupones between the hulupones recovery and the removal of the lupulones oxidation side-products: the higher the pH of the aqueous medium or mixture or the pH induced by the aqueous medium or mixture for the fractionation (by extraction or dissolution) of the hulupones, the higher the hulupones recovery, but at the expense of a lower hulupones purity. The overall hulupones recovery was improved by repeating the aqueous fractionation of hulupones and lupulones oxidation side-products. For example, after three times the remaining precipitate phase was essentially free of hulupones whereas the lupulones oxidation side-products remained in the precipitated phase. Hulupones recoveries>90% proved achievable combined with a removal of the lupulones oxidation side-products>95%, and hulupones recoveries>80% in combination with a lupulones oxidation side-product removal>99%.

Finally, the pH of the (combined) aqueous mixture(s) comprising hulupones in the potassium salt form was adjusted to about 10 with an aqueous potassium hydroxide solution (e.g. 1 M) to obtain a clear aqueous hulupones solution. As shown by analysis of the purified hulupones matters, the short-chain fatty acids present after the lupulones oxidation process (either from the starting material or formed during the oxidation process) proved to be removed for >99%.

Alternatively, hulupones were recovered from the (combined) aqueous mixture(s) by evaporation of water upon heating under vacuum and the remaining phase comprising hulupones in the potassium salt form was subsequently dissolved in food-grade ethanol. Hulupones were obtained in a>60% overall yield.

Alternatively, the hulupones can be recovered upon acidification of the (combined) aqueous mixture(s) (by for example addition of an aqueous sulfuric acid solution), which induces precipitation of the hulupones in the free acid form. Optionally, the hulupones can again be solubilized or dissolved in for example water or ethanol, in the free acid form or as a complex or salt, for example as an alkali metal salt.

The obtained solutions of potassium hulupates were used for the organoleptic evaluation, typically as aqueous solutions for the additions to the boiling wort and as ethanolic solutions for the post-fermentation additions.

Example 2

Production of Hulupones by Oxidation of Lupulones in Aqueous Process Medium at High Concentration and at Atmospheric Oxygen Pressure An aqueous alkaline 15 weight % lupulones solution, essentially free of hop oil monoterpenes and sesquiterpenes, was prepared from a commercially available aqueous alkaline 10 weight % lupulones solution (e.g. LupuStab®).

To that end, the starting material was treated according to the method described in Example 1.1. First, the content of hop oil mono- and sesquiterpenes was reduced by adsorption on a macroporous, non-acidic activated carbon (e.g. Organosorb® 10-AA) at ambient temperature.

After removal of the adsorbent by filtration, lupulones were separated from the aqueous process medium upon acidification with an aqueous sulfuric acid solution (e.g. 6 M). The precipitated phase comprising lupulones was washed with deionized water and subsequently dissolved in deionized water at about 70° C. by the addition of an aqueous potassium hydroxide solution (e.g. 1 M), corresponding to a potassium hydroxide to lupulones molar ratio of about 1.5. Finally, the mass concentration of lupulones was adjusted to 15 weight % by the addition of deionized water, and the pH of the obtained aqueous alkaline lupulones solution was about 13.

The oxidation of an aqueous alkaline 15 weight % lupulones solution was performed at atmospheric oxygen pressure, in a 1 L three-necked round-bottom flask equipped with a reflux condenser and a mechanical stirrer. The reactor was charged with 550 mL of an aqueous alkaline 15 weight % lupulones solution. The process mixture was stirred at 500 rpm and heated to and kept at 85° C. Gaseous oxygen at 1 bar was supplied to the process medium through a stainless steel porous diffuser at a flow rate of 20-40 mL/min. The aqueous process medium was maintained at a pH of about 11-12 by the continuous addition of an aqueous potassium hydroxide solution (e.g. 1 M) at a flow rate of 30 mL/h using an infusion pump. The process time was about 180 min. Afterwards, the reactor was cooled to about 70° C.

Analysis of the aqueous mixture obtained from the lupulones oxidation process showed the presence of, besides the desired hulupones, also the typical short-chain fatty acids and lupulones oxidation side-products (a.o. (dehydro)lupulenol, lupuloxinic acid, and to a lesser extent also hulupinic acid, lupulones derivatives with a retained six-membered ring from the original lupulones with a molecular weight higher than the lupulones, 5-(3-methyl-2-butenyl)-isohumulones, and bi- and tricyclic lupulones derivatives with a retained six-membered ring from the original lupulones).

This aqueous process mixture comprising hulupones was added either during the wort boiling stage or after the fermentation stage of the brewing process, for organoleptic evaluation.

Purified hulupones matters were produced according to the methods described in Example 1.3, for the removal of short-chain fatty acids and lupulones oxidation side-products (a.o. lupuloxinic acid, (dehydro)lupulenol, and to a much lesser extent also hulupinic acid, lupulones derivatives with a retained six-membered ring from the original lupulones with a molecular weight higher than the lupulones, 5-(3-methyl-2-butenyl)isohumulones, and bi- and tricyclic lupulones derivatives with a retained six-membered ring from the original lupulones).

The pH of the aqueous process mixture dropped to about 11 at >99% lupulones conversion, and was further reduced to a pH of about 6 by addition of an aqueous sulfuric acid solution (e.g. 6 M) to increase the recovery of hulupones. Hulupones were obtained in >60% overall yield.

Traces of short-chain fatty acid impurities may be present in the ethanolic hulupones products, since the removal of short-chain fatty acids was performed at pH 6. Short-chain fatty acids can be removed from the ethanolic hulupones solution by adsorption on a weakly basic anion-exchanging resin (e.g. Amberlite® IRA-67 free base).

To that end, 300 mL of the ethanolic hulupones solution was contacted with for example 100 g Amberlite® IRA-67 free base resin and the suspension was shaken at ambient temperature for 3 h. The liquid supernatant phase comprising hulupones was removed by decantation.

The purified ethanolic solution comprising hulupones in the potassium salt form, essentially free of 2-methyl-propanoic acid, 3-methyl-butanoic acid, 2-methyl-butanoic acid, 5-(3-methyl-2-butenyl)-isohumulones, lupulones derivatives with a retained six-membered ring from the original lupulones with a molecular weight higher than the lupulones, lupuloxinic acid, (dehydro)lupulenol, and bi- and tricyclic lupulones derivatives with a retained six-membered ring from the original lupulones, can be applied to impart bitterness in beer, and was added either during the wort boiling stage, or after the fermentation stage of the brewing process.

Example 3

Production of Hulupones by Oxidation of Lupulones in Aqueous Process Medium at Low Concentration and at Atmospheric Oxygen Pressure An aqueous alkaline 2.5 weight % lupulones solution, essentially free of hop oil monoterpenes and sesquiterpenes, was prepared from a commercially available aqueous alkaline 10 weight % lupulones solution (e.g. LupuStab®).

To that end, the starting material was treated according to the method described in Example 1.1. First, the content of hop oil mono- and sesquiterpenes was reduced by adsorption on a macroporous, non-acidic activated carbon (e.g. Organosorb® 10-AA) at ambient temperature.

After removal of the adsorbent by filtration, the mass concentration of lupulones was adjusted by the addition of deionized water. For instance, 125 mL of the aqueous alkaline lupulones solution was diluted with 375 mL deionized water, resulting in an aqueous 2.5 weight % lupulones solution at pH 11.

The oxidation of an aqueous alkaline 2.5 weight % lupulones solution was performed at atmospheric oxygen pressure, in a 1 L three-necked round-bottom flask equipped with a reflux condenser and a mechanical stirrer. The reactor was charged with 500 mL of an aqueous alkaline 2.5 weight % lupulones solution. The process mixture was stirred at 500 rpm and heated to and kept at about 95° C. Gaseous oxygen at 1 bar was supplied to the process medium through a stainless steel porous diffuser at a flow rate of about 20-40 mL/min. The process time was about 210 min.

Analysis of the aqueous mixture obtained from the lupulones oxidation process showed the presence of, besides the desired hulupones, also short-chain fatty acids and lupulones oxidation side-products (a.o. (dehydro)lupulenol and 5-(3-methyl-2-butenyl)-isohumulones, and to a lesser extent also hulupinic acid, lupulones derivatives with a retained six-membered ring from the original lupulones with a molecular weight higher than the lupulones, dihydrohulupones, and bi- and tricyclic lupulones derivatives with a retained six-membered ring from the original lupulones). Hulupones were obtained in >65% yield.

Example 4

Production of Hulupones by Oxidation of Lupulones in Ethanolic Process Medium at High Oxygen Pressure 4.1. Pretreatment An ethanolic alkaline lupulones solution was prepared from a commercially available aqueous alkaline lupulones solution (e.g. LupuStab®). First, the content of hop oil compounds, in particular monoterpenes and sesquiterpenes, was reduced by adsorption on a macroporous, non-acidic activated carbon (e.g. Desotec Organosorb® 10-AA).

To that end, a 1 L processing vessel was charged with 500 mL LupuStab® (containing about 50 g lupulones) and 5 g or 25 g Organosorb® 10-AA, which corresponds to an adsorbent loading of about 0.1-0.5 g/g lupulones.

After stirring the suspension at ambient temperature for about 6 h, and after removal of the adsorbent by filtration, the content of hop oil monoterpenes was reduced to <1% and the content of hop oil sesquiterpenes was reduced to <5%, expressed relative to the initial content of respectively mono- and sesquiterpenes (prior to the adsorptive removal).

Next, the obtained aqueous lupulones solution (500 mL), held in a 1 L vessel, was diluted with 250 mL deionized water and gradually acidified with an aqueous sulfuric acid solution (e.g. 6 M) while mixing (to induce a pH reduction of the aqueous phase from 10-11 to about 3-5). The aqueous lupulones solution turned into a suspension, and the formation of a separate phase was observed. After standing overnight, a clear supernatant phase was obtained (with a pH value of about 3-5) and analysis of the supernatant phase showed that the precipitation of lupulones was >99%.

The precipitated phase comprising lupulones was separated by decantation of the supernatant phase, washed twice with 100 mL deionized water and dried at ambient temperature, optionally under vacuum. Analysis of the obtained separate phase comprising lupulones showed the absence of the short-chain fatty acids 2-methyl-propanoic acid, 3-methyl-butanoic acid and 2-methyl-butanoic acid, originally present in the lupulones containing starting material.

Afterwards, the separate phase comprising lupulones was dissolved in ethanol, followed by the addition of an ethanolic potassium hydroxide solution (e.g. 1 M), corresponding to a potassium hydroxide to lupulones molar ratio of 1, while stirring at ambient temperature. Finally, ethanol was added to adjust the mass concentration of lupulones to 10 weight %.

4.2. Oxidation

The oxidation of lupulones in an ethanolic alkaline process medium or mixture was performed in the presence of magnesium cations, typically provided by addition of a magnesium salt. To that end, magnesium chloride was added to the ethanolic mixture comprising lupulones, corresponding to a magnesium cations to lupulones molar ratio of about 1, while stirring at ambient temperature.

Next, the oxidation was performed in a 1 L stainless steel batch reactor. The reactor was charged with the ethanolic process mixture comprising lupulones, sealed, purged with gaseous nitrogen and finally pressurized with gaseous oxygen at about 20 bar. The reactor was heated to and kept at about 60° C. while stirring. The process time was about 180 min. Afterwards, the reactor was cooled to ambient temperature.

Analysis showed that the ethanolic process mixture obtained from the alcoholic lupulones oxidation process contained, besides the desired hulupones, also a fraction of lupulones oxidation side-products (a.o. 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones). Hulupones were obtained in >70% yield.

This ethanolic process mixture comprising hulupones was added during the wort boiling stage of the brewing process, for organoleptic evaluation.

4.3. Purification

Solvent oxidation was observed during the oxidation of an ethanolic alkaline lupulones solution, however to a limited extent. Side-products derived from ethanol oxidation, such as acetic acid, may impart an unpleasant aroma in beer.

Hulupones and lupulones oxidation side-products were separated from the process mixture by precipitation upon addition of deionized water. To that end, one volume of deionized water was added to the organic process mixture. The liquid supernatant phase comprising a.o. water, ethanol and acetic acid was removed by decantation.

Further purification of the precipitated phase comprising hulupones and lupulones oxidation side-products was performed according to the methods described in Example 1.3.

The obtained aqueous and ethanolic solutions comprising hulupones were, for organoleptic evaluation, added during the wort boiling stage or after the fermentation stage of the brewing process.

Example 5

Preparation of Bittered Beer for Sensory Evaluation

Varying volumes of the aforementioned preparations, comprising hulupones and/or other compounds selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, hulupinic acid, dihydro-hulupones, hydroxy-hulupones, epoxy-hulupones and bicyclic hulupones derivatives with a retained five-membered ring as the ring of the hulupones were added to an unhopped lager beer (5 volume % alcohol, prepared from lager malt and with lager yeast) held in separate brown or green glass bottles, to obtain varying concentrations of the diverse compounds; for the hulupones addition for example the individual additions amounted to 20, 40 and 60 mg/L beer. Next, the bottles were flushed with nitrogen gas and closed, prior to the sensory evaluation.

Alternatively, varying volumes of the aforementioned preparations, comprising hulupones (typically, the hulupones addition amounted to 30, 60 and 90 mg hulupones per liter of wort) and/or other compounds selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, hulupinic acid, dihydro-hulupones, hydroxy-hulupones, epoxy-hulupones and bicyclic hulupones derivatives with a retained five-membered ring as the ring of the hulupones were added to boiling lager wort volumes, prepared from lager malt. The wort volumes were boiled for 45 min after the addition of the various preparations. After cooling the wort volumes, the wort volumes were pitched (with lager yeast), fermented, cooled, centrifuged and bottled (with nitrogen flushing) in brown or green bottles, prior to the sensory evaluation.

The evaluation of the bitterness, the detection of the possible presence of rancid aroma or of the occurrence of skunky thiol aroma, and the evaluation of the possible presence of haze, was performed with a multi-person triangle test (with a trained flavor panel), with pouring out the beer from the bottle in a clear glass drinking glass instantly followed by the sensory test.

It was found possible that bittering a non-hopped beer, by addition of purified hulupones products obtained by the methods disclosed in this invention, could have no negative impact in terms of aroma, taste or haze on the bittered beer, even upon post-fermentation addition and upon exposure to (visible) light. Good results were obtained with purified hulupones products with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, lupulones, dihydro-hulupones, hydroxy-hulupones, epoxy-hulupones and bicyclic hulupones derivatives with a retained five-membered ring below 10 weight % relative to the mass of hulupones present. Even better results were achieved with purified hulupones products with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, lupulones, dihydro-hulupones, hydroxy-hulupones, epoxy-hulupones and bicyclic hulupones derivatives with a retained five-membered ring below 5 and 2 weight % relative to the mass of hulupones present.

What is claimed is:

1. A method for the production of a hulupones product, comprising the oxidation of one or more lupulones, wherein the hulupones product has a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulone(s) with a molecular weight higher than the lupulone(s), and bi- and tricyclic lupulones derivatives with a retained six-membered ring from the original lupulone(s) below 20 weight %, relative to the mass of hulupones present, comprising carrying out the oxidation of one or more lupulones thereby forming one or more hulupones in a solvent medium comprising at least 50 volume % alcohol solvent, in the presence of one or more alkaline earth metal cations, provided as alkaline earth metal complexes or salts, transforming one or more alkaline earth metal hulupates into one or more hulupones in the free acid form, and dissolving one or more hulupones, from a precipitated phase comprising hulupones in the free acid form, by selective extraction with an aqueous medium, having a pH in the range of 3-7 whereas one or more lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones remain precipitated.

2. The method of claim 1, comprising removing at least partially the solvent from the medium in which the oxidation of the lupulones is carried out.

3. The method of claim 1, comprising transforming one or more alkaline earth metal hulupates into one or more hulupones in the free acid form obtained as a precipitated phase, also comprising lupulones oxidation side-products selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, by subjecting one or more alkaline earth metal hulupates to an acidification.

4. A method for the production of a hulupones product, comprising:
the oxidation of one or more lupulones, wherein the hulupones product has a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulone(s) with a molecular weight higher than the lupulone(s), and bi- and tricyclic lupulones derivatives with a retained six-membered ring from the original lupulone(s), below 20 weight %, relative to the mass of hulupones present,
carrying out the oxidation of one or more lupulones in an aqueous alkaline medium comprising at least 50 volume % water, thereby forming one or more hulupones and one or more lupulones oxidation side-products selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulone(s) with a molecular weight higher than the lupulone(s), and bi- and tricyclic lupulones derivatives with a retained six-membered ring from the original lupulone(s),
separating one or more hulupones from said lupulones oxidation side-product(s);
precipitating one or more hulupones as one or more alkali metal hulupates from the aqueous medium in which the oxidation of the lupulones is carried out,
separating the precipitated alkali metal hulupates from the aqueous medium,
transforming the alkali metal hulupates into hulupones in the free acid form obtained as a precipitated phase, also comprising lupulones oxidation side-products selected from the group of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones, and
transforming the precipitated alkali metal hulupates into hulupones in the free acid form by subjecting the alkali metal hulupates to an acidification.

5. The method of claim 4, wherein the acidification is by acidifying an aqueous medium wherein the alkali metal hulupates are dissolved or dispersed, or by mixing the precipitated phase comprising the alkali metal hulupates with an aqueous acidic medium.

6. The method of claim 1, further comprising dissolving one or more hulupones, from a precipitated phase comprising hulupones in the free acid form, into an aqueous medium whereas one or more lupulones oxidation side-products selected from the group of lupuloxinic acid, (dehydro)lupulenol, 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones remain precipitated.

7. The method of claim 1, wherein said dissolving one or more hulupones, from a precipitated phase comprising hulupones in the free acid form, by selective extraction with an aqueous medium, at a pH in the range of 4-5.

8. The method of claim 1, comprising carrying out the oxidation of one or more lupulones in a solvent medium comprising at least 50 volume % alcohol solvent, with an initial lupulones content between 0.5 and 50 weight %, and with an initial molar ratio of alkaline earth metal cations to lupulones in the range of 0.1-10; wherein the alkaline earth metal cation is provided in the solvent medium as an alkaline earth metal complex or salt.

9. The method of claim 4, comprising carrying out the oxidation of one or more lupulones in an aqueous alkaline medium with an initial lupulones content between 0.5 and 50 weight %, and with an initial molar ratio of alkali metal cations to lupulones in the range of 1-3; wherein the alkali metal cation is provided in the aqueous alkaline mixture as an alkali metal base or as alkali metal carbonate.

10. The method of claim 1, further comprising an adsorption process wherein an aqueous or alcoholic mixture comprising one or more lupulones and/or one or more hulupones and one or more hop oil compounds is contacted with an activated carbon adsorbent, whereby one or more hop oil compounds are at least partially removed from the aqueous or alcoholic mixture comprising lupulones and/or hulupones.

11. The method of claim 1, further comprising an ion-exchange process wherein an aqueous or alcoholic mixture comprising one or more lupulones and/or one or more hulupones and one or more short-chain fatty acid compounds is contacted with an anion-exchanger whereby one or more short-chain fatty acid compounds, selected from the group of 2-methyl-propanoic acid, 3-methyl-butanoic acid and 2-methyl-butanoic acid, are at least partially removed from the aqueous or alcoholic mixture comprising lupulones and/or hulupones.

12. A hulupones product, with a hulupones content of 1 to 50 weight %, with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, and lupulones below 20 weight %, relative to the mass of hulupones present, suitable as a bittering preparation in the production of beer and with a mass fraction of 5-(3-methyl-2-butenyl)-isohumulones below 10.0 weight % relative to the mass of hulupones present.

13. The hulupones product of claim 12, wherein the mass fraction of 5-(3-methyl-2-butenyl)-isohumulones below 5.0 weight % relative to the mass of hulupones present.

14. The hulupones product of claim 12, with a mass fraction of lupulones derivatives with a retained six-membered ring from the original lupulones with a molecular weight higher than the lupulones below 10.0 weight % relative to the mass of hulupones present.

15. The hulupones product of claim 12, with a mass fraction of bi- and tricyclic lupulones derivatives with a retained six-membered ring from the original lupulones below 10.0 weight % relative to the mass of hulupones present.

16. The hulupones product of claim 12, with a summed mass fraction of 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, hulupinic acid, dihydro-hulupones, hydroxy-hulupones, epoxy-hulupones and bicyclic hulupones derivatives with a retained five-membered ring as the ring of the hulupones below 10.0 weight % relative to the mass of hulupones present.

17. The hulupones product of claim 12, with a summed mass fraction of the short-chain fatty acids 2-methylpropanoic acid, 3-methylbutanoic acid and 2-methylbutanoic acid below 2.0 weight % relative to the mass of hulupones present.

18. The hulupones product of claim 12, being an aqueous solution of alkali metal salts of hulupones, with a hulupones content of 5 to 20 weight %.

19. The hulupones product of claim 12, being a solution of hulupones, in the free acid form or as a complex or salt, in an organic solvent, in ethanol or propylene glycol, with a hulupones content of 10 to 50 weight %.

20. A method of bittering a beverage, in particular a beer, comprising the use of a hulupones product according to claim 12, with a summed mass fraction of 2-methyl-propanoic acid, 3-methyl-butanoic acid, 2-methyl-butanoic acid, lupuloxinic acid, (dehydro)lupulenol, 5-(3-methyl-2-butenyl)-isohumulones, lupulones derivatives with a retained six-membered ring from the original lupulones with a molecular weight higher than the lupulones, bi- and tricyclic lupulones derivatives with a retained six-membered ring from the original lupulones, and lupulones below 20 weight %, relative to the mass of hulupones present, as a bittering preparation.

21. The method of claim 20, comprising the use of a hulupones product with a mass fraction of lupulones derivatives with a retained six-membered ring from the original lupulones with a molecular weight higher than the lupulones below 10.0 weight % relative to the mass of hulupones present.

22. The method of claim 20, comprising the use of a hulupones product with a mass fraction of bi- and tricyclic lupulones derivatives with a retained six-membered ring from the original lupulones below 10.0 weight % relative to the mass of hulupones present.

23. The method of claim 20, comprising the use of a hulupones product with a summed mass fraction of 5-(3-methyl-2-butenyl)-isohumulones, lupulones derivatives with a retained six-membered ring from the original lupulones with a molecular weight higher than the lupulones, and bi- and tricyclic lupulones derivatives with a retained six-membered ring from the original lupulones below 10.0 weight % relative to the mass of hulupones present.

24. The method of claim 20, comprising the use of a hulupones product with a summed mass fraction of the short-chain fatty acids 2-methylpropanoic acid, 3-methylbutanoic acid and 2-methylbutanoic acid below 2.0 weight % relative to the mass of hulupones present.

25. The method of 20, wherein said hulupones product is added prior to the (primary) fermentation stage of the brewing process, to the boiling wort.

26. The method of claim 20, wherein said hulupones product is added after the primary fermentation stage of the brewing process.

27. The method of claim 1, wherein the summed mass fraction is below 10 weight %.

28. The method of claim 4, wherein the summed mass fraction is below 10 weight %.

29. The hulupones product of claim 12, wherein the summed mass fraction is below 10 weight %.

30. The method of claim 1, said solvent medium comprising at least 50 volume % ethanol.

31. The hulupones product of claim 13 wherein said mass fraction of 5-(3-methyl-2-butenyl)-isohumulones is below 2.0 weight % relative to the mass of hulupones present.

* * * * *